June 9, 1953 W. S. W. EDGAR, JR 2,641,641

ELECTRONIC CODE TELEGRAPH READING AND REPEATING SYSTEM

Filed Feb. 15, 1949 2 Sheets-Sheet 1

*INVENTOR.*
W. S. W. EDGAR JR.
BY
M. J. Reynolds
ATTORNEY

ELECTRONIC CODE TELEGRAPH READING AND REPEATING SYSTEM

Filed Feb. 15, 1949 2 Sheets-Sheet 2

*INVENTOR.*
W. S. W. EDGAR JR.
BY M. J. Reynolds
ATTORNEY

Patented June 9, 1953 2,641,641

UNITED STATES PATENT OFFICE

2,641,641

ELECTRONIC CODE TELEGRAPH READING AND REPEATING SYSTEM

William Stanley Westerman Edgar, Jr., New York, N. Y., assignor to The Western Union Telegraph Company, New York, N. Y., a corporation of New York Application February 15, 1949, Serial No. 76,486

17 Claims. (Cl. 178—2)

This invention relates to an electronic code telegraph signal storing, reading and repeating system, and more particularly to such a system in which predetermined code impulses may be added to the code signals, if desired, and in which predetermined code signals may be identified and, if desired, eliminated from the repeated signals or utilized to perform selected functions.

One aspect of the invention involves the conversion of multiplex signals into start-stop or similar signals. Heretofore, it has been the usual practice in converting from multiplex signals to simplex signals to use a circuit arrangement consisting of both mechanical relays and electron tubes. The present invention successfully eliminates the need for using mechanical relays and permits the conversion to be effected solely by means of electron tubes. This elimination of mechanical relays results in a lower initial cost and in an economy of installation space. It also provides lower maintenance cost and an ability to operate at far higher speeds with no sacrifice in reliability.

Thus, one of the objects of this invention is to provide an improved solely electronic means of converting multiplex signals into simplex signals.

Another object of this invention is to provide an electronic method of deleting blank signals received over the incoming circuit. This is accomplished by a plurality of reading tubes which detect blank signal codes and act upon the reception of such signals to produce a marking pulse in place of the normally inserted spacing start pulse.

The ability of this circuit to read is not confined to reading blanks. By merely modifying certain leads, the described circuit can read any code character and record that reading by generating an indicative impulse. This impulse can be used in many ways such as operating a relay of a comparison circuit.

Therefore, still another object of this invention is to provide an electronic reading device that will be capable of reading any code character and recording an impulse in response thereto.

Figure 1:
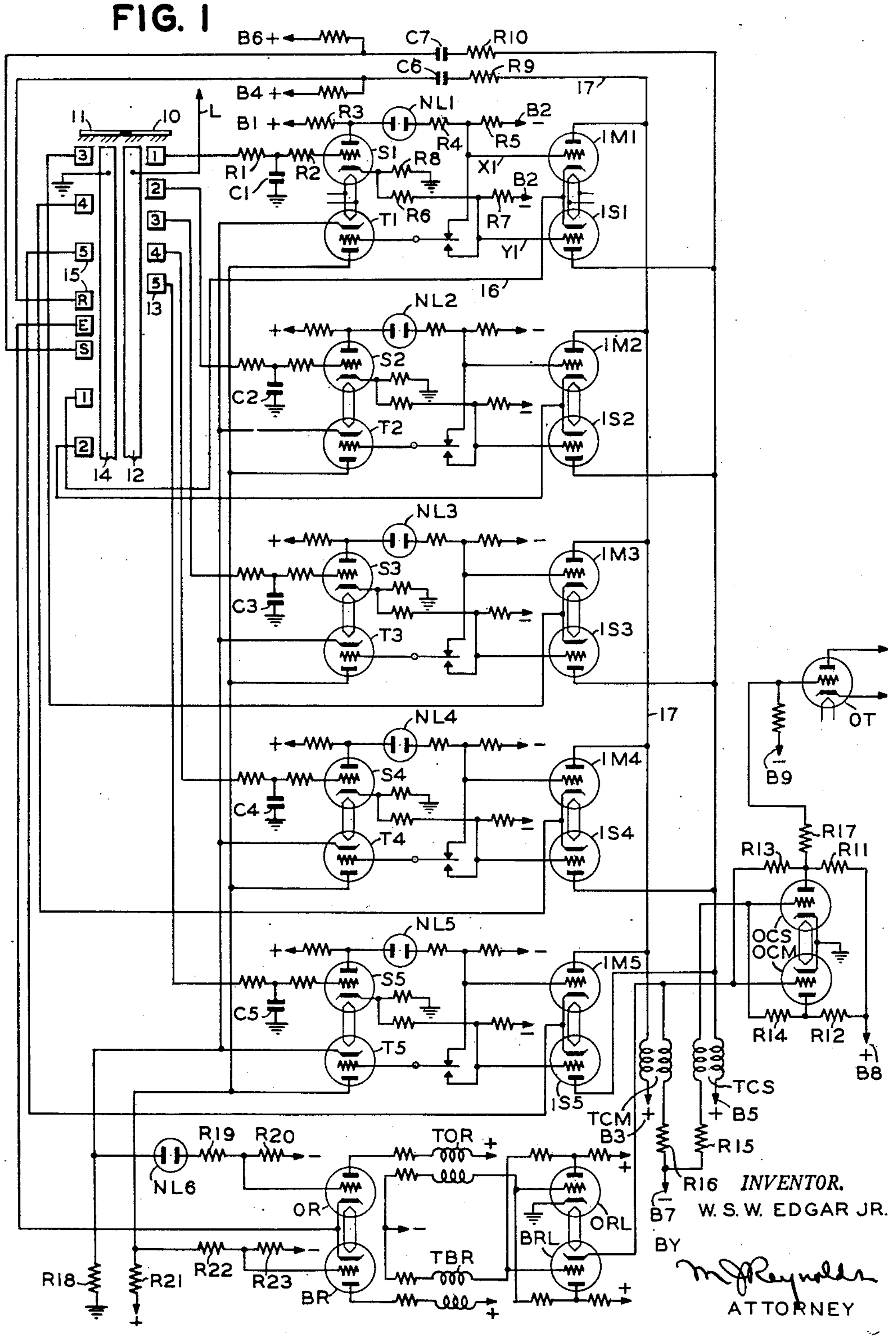
Figures 2, 3:
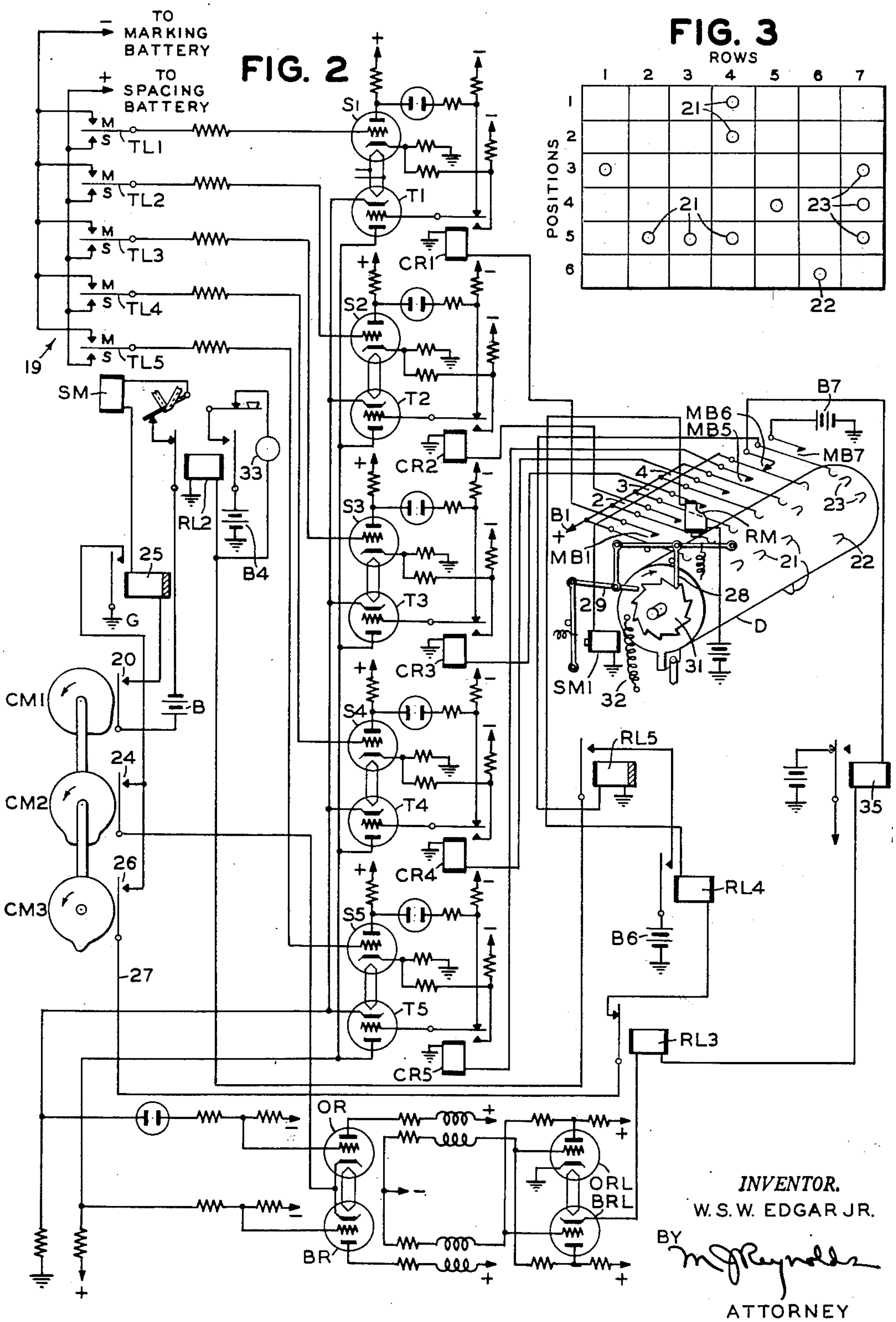

Other objects and features of this invention will appear more clearly from the following description taken in connection with the accompanying drawings, in which:

Fig. 1 diagrammatically illustrates a manner of converting multiplex signals into start-stop or simplex signals and for reading received blank signals and preventing their transmission over the outgoing simplex circuit;

Fig. 2 diagrammatically shows how the reading circuit of Fig. 1 can be arranged to read any desired character or group of characters; and Fig. 3 is a developed view of the pin arrangement of the contact operating drum D of Fig. 2.

Reference will first be made to Fig. 1 in which a developed portion of the signal distributor is shown having multiplex receiving brushes 10 and simplex brushes 11 with their respectively associated common and segmented rings 12, 13 and 14, 15.

The multiplex receiving ring 13 is divided into channels of five segments each, the segments of one channel being numbered consecutively 1 through 5 and the common or solid ring 12 being connected to the incoming line L. The teleprinter timing ring 15 is also divided into segments 1 through 45, and has in addition three extra segments R, E and S. Connected to this ring by means of brushes 11 is the common grounded ring 14. Brushes 10 and 11 are fixed to rotate simultaneously at the same relative position on the distributor.

The brushes on the teleprinter timing ring are so placed that shortly after all five segments on the multiplex ring have received their impulses, the brush on the teleprinter ring will contact in sequence the segment R, E and S. Segment S is the "start" segment and it is through this segment that the spacing signal needed to start the seven-unit teleprinter code is transmitted. After leaving the S segment the brush 11 will contact in succession segments 1 to 5 of the teleprinter ring, which apply ground to tube circuits energized by the five segments on the multiplex ring as hereinafter described.

After ground has been applied to the five tube circuits controlled by the multiplex segments 1 to 5, the rest segment R is again reached on the teleprinter ring. This, as will be explained, causes a rest or marking impulse to be transmitted to the outgoing line, thus completing the last unit of the seven-unit teleprinter code. The exploratory segment E on the teleprinter ring applies ground to a tube circuit arranged to read blanks described hereinafter in detail.

The five segments of ring 13 are connected, respectively, to the grids of five receiving storage tubes S1 to S5, through series resistances R1, R2 having a grounded condenser C1 connected therebetween. Thus as each signal impulse is received on the multiplex segments it is stored in the associated condensers C1 and serves to maintain the grids of tubes S1 to S5 charged either negatively or positively in accordance with the received signal impulses. The five receiving tube circuits are identical and therefore only that associated with multiplex segment 1 will be described.

The plate of tube S1 is connected to positive battery B1 through a resistance R3 and negative battery B2 is connected thereto through a neon lamp NL1 and a voltage divider network comprising resistances R4 and R5. The cathode of tube S1 is connected to ground through resistance R8 and to negative battery B2 through a voltage divider network comprising resistances R6 and R7.

The tube S1 determines the operation of either one of two tubes IM1 and IS1 depending upon the operative or inoperative condition of tube S1. For this purpose the grid of tube IM1 is connected between the voltage divider resistances R4 and R5 associated with the plate of tube S1 and the grid of tube IS1 is similarly connected between the resistances R6 and R7 associated with the cathode of tube S1. The cathodes of tubes IM1 and IS1 are connected to the number 1 segment of the simplex ring 15 over conductor 16 and the cathodes of the remaining tubes IM2 to IM5 and IS2 to IS5 are similarly connected, respectively, to the simplex segments 2 to 5 of ring 15. The anodes of tubes IM1 to IM5 are connected in parallel through the primary winding of a transformer TCM to positive battery B3. The primary of transformer TCM is also connected through a condenser C6, a resistance R9 and conductor 17 to the rest segment R of the simplex distributor ring. The condenser C6 is normally retained uncharged by the positive battery B4 connected to the opposite plate thereof from battery B3 and as a result of which whenever the simplex brush 11 grounds segment R, charging current flows from the condenser C6 through the primary of transformer TCM, to thereby transmit a rest impulse to line, as will subsequently appear. The signals consecutively received on the multiplex segments 1 through 5 of ring 13 have either a positive or a negative polarity, depending on whether spacing or marking signals are being received from the line. The circuit is arranged to operate with a negative marking condition and a positive spacing condition. By switching the lead X1, connected to the grid of tube IM1 with the lead Y1 connected to the grid of the tube IS1, this circuit will work from a multiplex channel that marks on positive battery. For the sake of simplicity we will describe the circuit as it is set up, i. e., arranged to operate from a multiplex channel which marks on negative battery.

It should be noted that although only one channel of five multiplex segments of ring 13 and the corresponding teleprinter segments of ring 15 are depicted on the circuit diagram, any number of channels, consistent with limitations of space, may be provided.

The operation of the circuit for the channel shown will be described and this description will suffice for any number of channels. For this purpose an arbitrary combination of signals received over the first channel will be selected. Assume that the combination selected consists of impulses conventionally stated as marking, spacing, spacing, marking, marking or impulses which are — + + — —. This is letter B of the Baudot code.

Such being the case, the first received impulse will be a negative or marking signal on the common ring 12 from which it will be applied through multiplex segment 1 of ring 13 to the storage condenser C1. It is necessary to store the Baudot code units long enough to enable the starting pulse, which will be described in detail below, to initiate transmission of the received code over the teleprinter line. This is accomplished in part by making the discharge path of the condenser to the grid of tube S1 of such high resistance that the condenser will hold its charge for one revolution. The resistance R2 serves this purpose. The resistance R1 is a protective device for segment 1 or ring 13 from the residual charge on condenser C1.

The negative impulse coming from segment 1 places a negative potential on the grid of tube S1 so that this tube will remain unoperated. It will be recalled that the potential on the grid of tube IM1 is regulated by the connection from the anode of the tube S1 to the grid of the tube IM1; and the potential across the grid of the tube IS1 is regulated by the connection between the cathode of the tube S1 and the grid of the tube IS1. With the tube S1 in a non-conducting condition the voltage divider network operates in the following manner. A positive potential from battery connection B1 will be applied through resistor R3, the neon lamp NL1 and resistor R4 to the grid of tube IM1. This positive potential will be of sufficient value to cancel out the negative potential coming from battery connection B2 through resistor R5 and to apply the proper positive potential to the grid of tube IM1. However, at this time the cathode circuit of tube IM1 is open at the simplex segment 1 of ring 15.

With tube S1 non-conducting, as stated, the grid of tube IS1 receives a negative potential from battery connection B2 through resistor R7 making tube IS1 also non-conducting.

The multiplex brush next makes contact with segment 2 on the multiplex receiving ring 13 and a positive charge is stored on the condenser C2 associated with this segment as in the circuit described above. This being a positive signal, however, it causes the grid of tube S2 to be driven positive thus making the tube conducting and thereby providing a shunt path from battery B1 to the grid of tube IS2, thus rendering this tube positive and causing the grid of tube IM2 to be charged negatively from battery B2. Tube IS2 thus becomes conditioned for operation upon the completion of its cathode circuit through simplex segment 2 of ring 15.

After a pulse, of either negative or positive polarity, has been stored in all five circuits connected to segments 1 to 5 of the multiplex receiving ring 13, to condition one or the other of each pair of tubes IM1 to IM5 and IS1 to IS5, the brush 11 passes over segments R and E, the purpose of which will be hereinafter described and then makes contact with the starting segment S. Thus, a ground is applied from segment S to one side of condenser C7. This results in a pulse through the primary winding of transformer TCS and resistance R10, to the ungrounded side of condenser C7. As brush 11 moves from segment S, ground is removed from this segment causing a potential to be induced in the secondary winding of transformer TCS, in opposition to the negative battery B7, thereby making the grid of a tube OCS positive and rendering the tube conducting.

The tube OCS is connected to the tube OCM in a conventional "trigger circuit" which operates on the principle that only one tube at a time may pass plate current. Thus the plate potential for tubes OCS and OCM is supplied from battery B8 through the resistances R11 and R12 respectively, and the grid of each tube is provided with a positive bias from the plate potential of the other tube, through limiting resistances R13 and R14, respectively. An opposing negative potential is supplied to the grid of tube OCS from battery B7, resistance R15 and the secondary winding of transformer TCS. Likewise, the grid of tube OCM is connected to negative battery B7 through resistance R16 and the secondary winding of transformer TCM.

Normally, with no signals being transmitted the marking tube OCM will be conducting and will shunt out the positive biasing potential for tube OCS so that the grid of this tube is held negative by battery B7.

An output tube OT having its grid also connected through resistances R11 and R17 to the positive battery B8, in opposition to its negative grid bias B9, is conducting at this time.

However, upon the generation of a positive pulse through transformer TCS by the start segment S, as described, the grid of tube OCS is driven strongly positive and it becomes conducting, extinguishing tube OCM. The operation of tube OCS shunts out the positive grid bias for the output tube OT and this tube becomes non-conducting thereby transmitting a start or spacing signal to line. Thus, the space signal necessary to start the teleprinter code is transmitted and it is now time to transmit the five code impulses of the received character signal. The brush 11 on the teleprinter timing ring 15 now moves on the ring for a space equal to one impulse period and contacts segment 1. Thus a ground is supplied over conductor 16 to the cathodes of the tubes IM1 and IS1. In the example assumed, as will be recalled, the grid of tube IM1 was made positive due to the negative charge stored in condenser C1. With the ground thus applied, tube IM1 becomes conducting and sends a pulse through the primary winding of transformer TCM. The secondary winding of this transformer receives the pulse through normal transformer action and applies the resulting positive potential to the grid of tube OCM. This positive potential causes tube OCM to conduct and by virtue of the trigger circuit, explained above, tube OCS becomes non-conducting. The circuit is arranged, through the shown resistors, so that when tube OCM is conducting, a positive potential of sufficient strength to operate the output tube OT is applied to the grid of this tube which thereby marks the teleprinter line. In a like manner, the four remaining impulses of the code are transmitted to the teleprinter line.

After the ground has been applied to the fifth segment of ring 15 to transmit the final impulse of the code signal, it contacts rest segment R. This segment reacts in the same manner as segment S by grounding condenser C6. This condenser, however, is connected to the primary winding of transformer TCM, instead of transformer TCS. Therefore, the secondary winding of transformer TCM will apply a positive potential across the grid of tube OCM and, by virtue of the trigger circuit action, the output tube OT will mark the teleprinter line. This completes the transfer of the five-unit multiplex code into the seven-unit, start-stop or teleprinter code. It should be noted that the segments on the teleprinter timing ring are so oriented that, for example, while a ground is applied to the circuits of segments 3 and 4 of the teleprinter ring, segments 1 and 2 of the multiplex ring are receiving their next signal impulse.

The circuit as described above would also transmit to the teleprinter line each blank or all spacing signal received, since it would be stored in the condensers connected to the tubes S1 to S5 as positive potentials and therefore would space the teleprinter line the same as any other signal. To prevent repetition of these blank signals over the teleprinter line, a way has been devised by which tube OCS will not be able to conduct despite the positive potential imposed upon its grid by the spacing signal combination. This is accomplished by applying a large positive bias on the grid of tube OCM thus "locking" the trigger circuit.

This locking process operates in the following manner. In order to perform the blank reading function each tube S1 to S5, either through its cathode or anode, controls the grid of a comparison tube T1 to T5. All of the tubes T1 to T5 have common plate and cathode resistors R21 and R18, respectively. Resistances R19 and R20 and neon lamp NL6 form a voltage divider network connected to the grid of tube OR. Likewise the resistances R22 and R23 form a voltage divider network connected to the grid of tube BR. The grids of tubes T1 to T5 are connected to the grids of the corresponding tubes IM1 to IM5 so as to respond to received marking and spacing signals in the same manner as tubes IM1 to IM5.

If all of the condensers connected to the grids of tubes S1 to S5 receive a positive charge (i. e., a blank or all spacing signal is registered) none of tubes T1 to T5 will become conducting. This occurs as a result of the positive charge being placed on the grids of tubes S1 to S5 thus rendering each of the tubes S1 to S5 conducting. Hence, a positive potential is applied from battery connection B1 through R3 and R6 to the grids of each of the tubes IS and consequently a negative potential is applied to all of the tubes IM1 to IM5 and T1 to T5 from battery connection B2, through resistance R5.

Thus with all five of the tubes T1 to T5 non-conducting, the voltage divider networks are so connected to the grids of tubes OR and BR as to regulate those tubes in the following manner:

A positive potential is normally applied to the grid of tube BR through resistances R21 and R22. Resistances R21, R22 and R23 are so selected that, with tubes T1 to T5 non-conducting, this positive potential will be greater than the negative potential applied at the terminal of resistance R23, and the grid of tube BR will thereby be maintained positive. At the same time, the grid of tube OR will be maintained negative due to the negative potential from battery at the terminal of resistance R20. In order for tube OR or BR to pass current, a ground must be applied to the cathodes of the two tubes. This is accomplished by the exploratory segment E on the teleprinter ring. After the five impulses are stored on condensers C1 to C5 and before starting segment S is reached, the brush 11 reaches exploratory segment E which grounds the cathodes of tubes OR and BR.

Since the grid of tube BR is positive it becomes conducting causing a current flow through the primary winding of transformer TBR which thus induces a positive pulse in its secondary winding from where it is transmitted to the grid of tube BRL. Tubes BRL and ORL are connected in a conventional "trigger circuit" just as tubes OCS and OCM were. Because of the characteristics of such a circuit, explained above, when the grid of tube BRL received a positive charge from the secondary winding of transformer TBR, it becomes conducting and tube ORL becomes non-conducting.

A high positive potential thus flows from tube BRL to the grid of tube OCM. This high positive potential on the grid of OCM will prevent the smaller positive potential on the grid of tube OCS from working the trigger circuit (i. e., making tube OCM non-conducting) and hence the circuit locks and no change is set to the output tube controlling the teleprinter line, and therefore the received blank signal is not transmitted. Tube BRL continues to operate and block transmission of spacing impulses over the outgoing line until a character other than blank is received from the multiplex line.

When a character other than blank is received, one or more of the five condensers C1 to C5 connected to the tubes S1 to S5 will receive a marking pulse and will result in one of the tubes T1 to T5 becoming conducting. Thus, with any one of the tubes T1 to T5 conducting, the voltage drop occurring through resistance R21 causes the negative battery at the terminal of resistance R23 to predominate so as to drive the grid of tube BR negative and the positive potential impressed through one or more of the operating tubes T1 to T5, neon lamp L6 and resistance R19 predominates over the negative potential from the terminal of resistance R20 so that the grid of tube OR is driven positive.

Thus, when the ground is applied at segment E, tube OR becomes conducting causing current flow through the primary winding of transformer TOR and inducing a positive charge in the secondary winding of TOR. Tube ORL thus receives a positive grid potential, making it conducting. It thereby operates the trigger circuit which extinguishes tube BRL and interrupts the high positive bias to the grid of tube OCM. The trigger circuit, made up of tubes OCM and OCS, is thus allowed to function normally.

Thus, it will be noted, a purely electronic arrangement has been provided for converting multiplex signals into simplex or start-stop signals and for eliminating blank signals from retransmission. The circuit is capable, however, of reading other characters than blanks as will now be described.

Referring to Fig. 2, a developed portion of a tape transmitter 19 is shown consisting of five tongues TL1 to TL5 operatively connected to five tape sensing pins (not shown). Each tongue is electrically connected to the grid of one of the receiving tubes S1 to S5 and moves between two contact points M and S. The marking contacts M are connected to the marking terminal of the line battery, and the spacing contacts S are connected to the spacing terminal. When perforated tape is fed over the pins (not shown), the tongues operate between the marking and spacing contacts in conventional manner. The stepping pulse for the transmitter is produced by the action of a continuously rotating cam CM1, and associated contacts 20, which closes periodically to apply battery B to the stepping magnet SM which, in turn, steps the tape transmitter.

The five code signals are developed simultaneously and either come from the marking or from the spacing battery, depending on the position of the tongues TL1 to TL5. The marking and spacing polarities are applied to the grids of tubes S1 to S5 for one revolution of cam CM1 by the tape transmitter as is well understood in the art. The spacing or positive signals will render tubes S1 to S5 conducting, while the marking or negative signals will render said tubes non-conducting. Each tube S1 to S5 has an associated tube T1 to T5, as in the modification of Fig. 1. The grid of each tube T1 to T5 is connected through an individual voltage divider network either to the anode or the cathode of its corresponding tubes S1 to S5, depending upon the position of the armatures of code relays CR1 to CR5, the tongues of which are arranged in the grid circuits. Through the use of a drum D containing predetermined contact pins and make-break contacts, as hereinafter more fully described, the relays CR1 to CR5 are energized in a predetermined manner so that a certain code letter or figure signal from transmitter 19 will render the grids of all tubes T1 to T5 negative. This, as will subsequently appear, serves to operate the electronic reading device which serves to compare the transmitted character with a predetermined code character on the drum D.

The drum D with its stepping ratchet and pawl arrangement is explained in general in Patent 2,193,809. The only basic difference resides in the arrangement of the contact pins, representing predetermined characters and intelligence signals. On the drum D, as noted in the developed view of Fig. 3, the pins are arranged as follows: The first five angular positions in each concumferential row represents a code character. Pins 21 are placed in each location where a marking impulse appears in the code signal. A make-before-break contact MB1 to MB5 is positioned opposite each circumferential row of pins 21 so as to be closed by the pins forming the successive code characters in each successive angular position of the drum.

Also, positioned on the drum in the sixth angular position and sixth circumferential row is a function pin 22 that opens make-break contact MB6 when the drum moves into its sixth position. Contact MB6 controls the operating circuit for the drum stepping magnet SM1.

On the drum in the seventh circumferential row and the third, fourth and fifth angular positions are three contact pins 23 which operate a make-break contact MB7 to close a circuit for a slow-to-release relay RL5 in the third, fourth and fifth angular positions of the drum D. Relay RL5 controls, in part, a circuit for the relay RL2, the function of which is to stop the tape transmitter and to give a warning signal when a different sequence of characters is received, than that set up in the drum D, as will later appear.

For purposes of explanation the following characters to be compared will be chosen: Two periods must first be received followed by the letters E, T and C in that order. Two periods represent the normal end-of-message signal in telegraph reperforator switching systems and the function of the double period is to indicate to the circuit that it should condition itself to compare the code ETC.

The drum and relays are arranged in such a manner that after one period signal is received the drum is stepped around to angular position two. Since the pin arrangement in positions 1 and 2 are the same, the period combination remains set up on the comparison relays CR1 to CR5. If the next received character is also a period, drum D is actuated into position 3 to set up the letter E combination on the relays CR1 to CR5 so that the received code character E will cause the electronic reading device to respond.

Thus each letter is compared until the letter C has been received. When the letter C code combination has been properly compared the drum D rotates into the sixth angular position, opening the function contact MB6 to interrupt the stepping magnet circuit.

The drum D is so arranged that in its normal angular position the period code combination, consisting of the fourth pulse marking, is the only code signal that will operate the electronic reading device. This is due to the fact that the make-break contacts, MB4 in circuit with comparison relay CR4 are closed by the particular arrangement of the contact pins on the drum D in its home position. With the circuit closed through relay CR4, current from battery connection B1 energizes said relay which causes its armature to be attracted thereby opening the circuit of the grid of the reading tube T4 from the anode of the signal receiving tube S4 and closing the circuit from the cathodes of tube S4 to the grid of tube T4. When the relays CR1 to CR5 are not energized their armatures are held on their back contacts so that they complete the circuits from the anodes of tubes S1 to S5 to the grids of tubes T1 to T5. This switching or conditioning of certain circuits is necessary to that a predetermined code letter or figure will render all the tubes T1 to T5 negative and thereby operate the electronic reading device, which completes the comparison of the predetermined code character on the drum D with the transmitted character, as will later appear.

The comparison circuits will now be traced in detail. Let it be assumed that the drum D is in its home position with a period signal set upon relays CR1 to CR5 and that a period signal is transmitted from the tape transmitter 19. Relay CR4 will be operated from the drum D in accordance with fourth marking pulse of the period code. The tape transmitter will transmit positive or spacing pulses to the grids of tubes S1, S2, S3 and S5, and a negative or marking pulse to the grid of tube S4. Consequently, tubes S1, S2, S3 and S5 will become conducting and tube S4 will be non-conducting.

The grids of comparison tubes T1, T2, T3 and T5 are connected at this time through the back contacts of unoperated relays CR1, CR2, CR3 and CR5 and thence to the respective plate circuits of selecting tubes S1, S2, S3 and S5. Since tubes S1, S2, S3 and S5 are conducting, their anode potentials will be low and the grids of tubes T1, T2, T3 and T5 will be biased negatively from the voltage divider circuits between the negative supply terminals and the anodes of the respective tubes S1, S2, S3 and S5 so that they will not become conducting.

The grid of comparison tube T4, however, is connected through the front contact of operated comparison relay CR4 and thence to the cathode circuit of the corresponding selecting tube S4. Since a negative or marking signal is supplied to the grid of tube S4 by the tape transmitter, tube S4 will remain non-conducting. The grid of tube T4 will, therefore, receive a negative bias from the voltage divider circuit between the negative supply terminal and ground. Accordingly, tube T4 will also remain non-conducting. Any code combination other than the period signal, however, would have caused at least one of the comparison tubes to have become operative. For instance, if a spacing signal had been applied to the grid of tube S4 so that this tube became conducting, the grid of tube T4 would have received a positive potential from the cathode circuit of tube S4 and tube T4 would also have become conductive.

Shortly after the transmission of the period signal a second cam CM2, fixed to rotate with the transmitter pulsing cam CM1, closes its contact 24 to apply ground, at the armature of slow-to-release relay 25, to the cathodes of the tubes OR and BR. Tube BR only will become conducting, as explained in connection with Fig. 1. This will supply an impulse from tube BRL over a circuit including the relay RL3 and normally closed drum contact MB6 to the winding of the drum stepping magnet SM1, whereupon the drum ratchet and pawl mechanism advanced the drum D into its second position, thereby setting up the second period on relays CR1 to CR5 for comparison. During the period of closing of cam contact 24, a third cam CM3 closes and opens a contact 26 to apply ground to circuit 27. This circuit, however, is open at the back contact of operated relay RL3 and no function is performed by the cam at this time.

The second period signal is now set up on the relays CR1 to CR5 and as the cam CM1 completes its next revolution another character is set up in the tape transmitter. If this should also be a period signal all of the tubes T1 to T5 are rendered non-conducting and as cam CM2 closes its contact 24 a second pulse is produced by the tube BRL to step the drum D into its third position.

Had this character been any character other than a period, one of the tubes T1 to T5 would have been conducting and as a result the tube BRL would have been non-conducting upon the closure of cam contact CM2. In this case relay RL3 would have remained unoperated and upon the overlapping closure of cam contact 26, a circuit would have been completed from ground G, armature of relay 25, contact 26, conductor 27, back contact and armature of relay RL3 and winding of relay RL4 to the stepping pawl release magnet RM, thus withdrawing pawls 28 and 29 from the ratchet wheel 31 and permitting the drum D to return to its first or home position by the spring 32, thus conditioning the drum to await the next double period signal from the tape transmitter.

However, let it be assumed that the two periods were received so that the drum D is now in its third position of operation with the character E set up on relays CR1 to CR5. The purpose of the present arrangement is to stop the tape transmitter and warn an attendant should any sequence of signals other than ETC follow the double period. For this purpose, the drum D is provided with the contact operating pins 23 in the third, fourth and fifth angular positions of the seventh circumferential row, upon which the letter codes E, T and C are arranged. This pin 23 closes drum contact MB7 to apply battery to the winding of the relay RL5, which in turn prepares a circuit from the make contact of relay RL4 to the winding of signal relay RL2.

Assume first that the next three characters transmitted from the tape are the letters E, T and C. The first letter E, which is spacing, marking, marking, marking, marking, will not energize any of the tubes T1 to T5 since relay CR1 only is now operated from the drum D. Consequently, a proper comparison of the transmitted character and that set up on drum D having been made and matched, another stepping pulse is generated through the action of cam CM2 and tube BRL to step the drum D into the fourth position to set up the letter T code for comparison. After the final letter C is compared the drum D advances to its final or sixth position. In this position a single pin 22 on the sixth circumferential row opens the contact MB6, thus interrupting the drum stepping magnet circuit.

Any character transmitted following this last movement of the drum will restore the drum to its home position since relay RL3 will now be unenergized and upon the next revolution of the pulsing cam CM3 the circuit will be completed to ground from the battery at the terminal of the drum release magnet RM.

Let us assume now that after the two successive periods have been transmitted and compared, and the drum controlled relays CR1 to CR5 have been conditioned to read the letter E, some other character, such as the letter B, is transmitted. In the case of the letter B the tubes S4 and S5 will receive negative potentials on their grids instead of positive ones as in case of the letter E. Since the make-break contacts MB4 and MB5 will not be closed at this time the armatures of relays CR4 and CR5 will remain in normal position, i. e., connecting the plates of tubes S4 and S5 to the grids of tubes T4 and T5 respectively.

With S4 and S5 non-conducting the voltage divider networks will impose positive potentials on the grids of tubes T4 and T5. This, in turn, will cause the voltage divider networks connected to tubes OR and BR to make tube OR conducting and tube BR non-conducting. When ground is applied to the tube OR by the action of cam CM2, the trigger circuit consisting of tubes ORL and BRL will operate conventionally and no impulse will be transmitted to relay RL3. Therefore, the armature of relay RL3 remains on its back contact so as to complete the circuit regulated by cam CM3. As explained heretofore, the cams CM1, CM2 and CM3 are so constructed that the tape stepping function of cam CM1 is completed before cam CM2 applies ground to the cathodes of tubes OR and BR, and after said ground has been applied and before it has been withdrawn, the cam CM3 closes its associated contact thereby applying battery to relay RL4, providing the circuit 27 is still closed at relay RL3. In the case assumed circuit 27 will be closed, so that relay RL4 as well as drum release magnet RM will be energized. The operation of relay RL4 applies battery to the relay RL2 through the make contact of relay RL5. It will be recalled that relay RL5 became operated upon the stepping of the drum D following the comparison of the second period, due to the contact pin at row 7 of drum position 3 closing the make-break contact MB7. Relay RL2 at its left armature breaks the stepping circuit of magnet SM, thus stopping the transmitter. The right-hand armature of relay RL2 closes a circuit from battery to a warning signal 33. Thus, if a character other than that set up on drum D is transmitted the tape transmitter is stopped so an investigation can be made. The contact pins 23 of row 7 in drum posiitons 4 and 5 provide a similar means of checking the letters T and C.

Thus, it will be noted, an arrangement has been provided, using electronic reading or comparison means for detecting the presence, in transmitted signals of any predetermined character or series of characters. Such an arrangement is adaptable to the reading or comparison of code switching signals for determining or checking an automatic switching operation, for detecting supervisory signals or for the control of any mechanism in response to a predetermined code. For this purpose the drum contact MB6, which opens only upon the completion of the cycle of operation of the drum D, may serve to control any such mechanism, as for instance, by the release of a normally energized relay 35 in circuit therewith.

Obviously, however, other means of effecting the transfer of the grid circuit of tubes T1 to T5 from the plate to the cathode circuits of tubes S1 to S5 may be employed to condition the tubes T1 to T5 to read desired characters, that shown being by way of example only.

What is claimed is:

1. A permutation code reading apparatus comprising an electronic device individual to each impulse of the permutation code, an input circuit and an output circuit for each of said devices, means for applying permutation code signals to said input circuits to operate said devices selectively, individual electronic means coupled in a predetermined manner with the output circuit of each of said devices, means for modifying said manner of coupling in accordance with a predetermined permutation code and means common to each of said individual means and operative only when the permutation code signal applied to said input circuits corresponds to said predetermined permutation code.

2. A permutation code reading apparatus comprising an electronic device individual to each impulse of the permutation code, an input circuit and an output circuit for each of said devices, means for applying permutation code signals to said input circuits to operate said devices selectively, individual electronic means coupled in a predetermined manner with the output circuit of each of said devices, means for modifying said manner of coupling in accordance with a predetermined permutation code, means for repeating the signals applied to said input circuits and means for preventing the operation of said repeating means when the permutation code signal applied to said input circuits corresponds to said predetermined code.

3. A permutation code reading apparatus comprising an electronic device individual to each impulse of the permutation code, an input circuit and an output circuit for each of said devices, means for applying permutation code signals to said input circuits to operate said devices selectively, and a second electronic device individual to each of said first electronic devices, an input circuit for each of said second electronic devices, selective means for coupling said last input circuit to the output circuit of the corresponding first electronic device in a manner either to render said electronic device conductive when said first selecting device is conducting or nonconductive when said first selecting device is conducting, means for operating said selective means in accordance with a permutation signal code, a common output circuit for said second electronic devices and means in said output circuit operable selectively in accordance with the coincidence or lack of coincidence of the permutation signal code with the applied permutation code signal.

4. A permutation code reading apparatus comprising an electronic device individual to each impulse of the permutation code, an input circuit and an output circuit for each of said devices, means for applying permutation code signals to said input circuits to operate said devces selectively, a second electronic device individual to each of said first electronic devices, an input circuit for each of said second electronic devices, said last input circuit being coupled to the output circuit of the corresponding first electronic device in one or the other of two different manners in accordance with a predetermined permutation code such that one or more of said second electronic devices will be operated whenever the permutation code signal applied to the first electronic device differs from said predetermined permutation code, means for repeating the signals applied to said first electronic devices and means controlled by said second electronic devices for rendering said repeating means effective or ineffective.

5. A permutation code reading apparatus comprising an electronic device individual to each impulse of the permutation code, an input circuit and an output circuit for each of said devices, means for applying permutation code signals to said input circuits to operate said devices selectively, a second electronic device individual to each of said first electronic devices, an input circuit for each of said second electronic devices, said last input circuit being coupled to the output circuit of the corresponding first electronic device in one or the other of two different manners in accordance with a predetermined permutation code such that one or more of said second electronic devices will be operated whenever the permutation code signal applied to the first electronic device differs from said predetermined permutation code, and means for modifying the said connections of the input circuits of said second electronic devices in accordance with a different predetermined permutation code.

6. A permutation code reading apparatus comprising an electronic device individual to each impulse of the permutation code, an input circuit and an output circuit for each of said devices, means for applying permutation code signals to said input circuits to operate said devices selectively, a second electronic device individual to each of said first electronic devices, an input circuit for each of said second electronic devices, said last input circuit being coupled to the output circuit of the corresponding first electronic device in one or the other of two different manners in accordance with a predetermined permutation code such that one or more of said second electronic devices will be operated whenever the permutation code signal applied to the first electronic device differs from said predetermined permutation code, and means for automatically modifying the said connections of the input circuits of said second electronic devices in accordance with a succession of varying predetermined permutation codes.

7. A permutation code reading apparatus comprising an electronic device individual to each impulse of the permutation code, an input circuit and an output circuit for each of said devices, means for applying permutation code signals to said input circuits to operate said devices selectively, a second electronic device individual to each of said first electronic devices, and an input circuit for each of said second electronic devices, said last input circuit being connected to the output circuit of the corresponding first electronic device in one or the other of two different manners in accordance with a permutation code whereby operation of each of said electronic devices is jointly controlled by said manner of connection and the operation of its corresponding first electronic device.

8. A permutation code reading apparatus comprising an electronic device individual to each impulse of the permutation code, an input circuit and an output circuit for each of said devices, means for applying permutation code signals to said input circuits to operate said devices selectively, a second electronic device individual to each of said first electronic devices, an input circuit for each of said second electronic devices, said last input circuit being connected to the output circuit of the corresponding first electronic device in one or the other of two different manners in accordance with a permutation code whereby operation of each of said electronic devices is jointly controlled by said manner of connection and the operation of its corresponding first electronic device, and means for modifying the manner of said connection in accordance with a different permutation code.

9. A permutation code reading apparatus comprising an electronic device individual to each impulse of the permutation code, an input circuit and an output circuit for each of said devices, means for applying permutation code signals to said input circuits to operate said devices selectively, a second electronic device individual to each of said first electronic devices, an input circuit for each of said second electronic devices, said last input circuit being connected to the output circuit of the corresponding first electronic device in one or the other of two different manners in accordance with a predetermined permutation code whereby operation of each of said electronic devices is jointly controlled by said manner of connection and the operation of its corresponding first electronic device, a common output circuit for said second electronic devices and means associated with said common output circuit operative whenever the permutation code signal applied to said first electronic devices corresponds to said predetermined permutation code.

10. A permutation code reading apparatus comprising an electronic device individual to each impulse of the permutation code, an input circuit and an output circuit for each of said devices, means for applying permutation code signals to said input circuits to operate said devices selectively, a second electronic device individual to each of said first electronic devices, an input circuit for each of said second electronic devices, said last input circuit being connected to the output circuit of the corresponding first electronic device in one or the other of two different manners in accordance with a predetermined permutation code whereby operation of each of said electronic devices is jointly controlled by said manner of connection and the operation of its corresponding first electronic device, a common output circuit for said second electronic devices and electronic means associated with said common output circuit for control thereby.

11. Apparatus for reading permutation code signals comprising a source of signals, a plurality of receiving devices, a distributor for applying signal impulses from said source selectively to said receiving devices, a plurality of corresponding reading electron tubes having input electrodes and output circuits, separate voltage divider networks in the anode and cathode circuits of said receiving devices, means for selectively connecting the input electrode of each reading tube to one or the other of the voltage divider networks of its corresponding receiving device, in accordance with a permutation code, such that each reading tube will be rendered operative or inoperative upon operation of its corresponding selector device, depending upon the particular voltage divider network to which its control electrode is connected, and means in the output circuits of said reading tube for indicating a correspondence or lack of correspondence of said last permutation code with the permutation code signal applied to said receiving devices.

12. Apparatus for reading telegraph code signals comprising a source of signals, a plurality of receiving electron tubes having anodes, cathodes and control grids, said control grids being connected to said source of signals, a plurality of electron reading tubes having anodes, cathodes and control grids, a voltage divider network in the anode-cathode circuit of each receiving tube, selecting means for selectively connecting the grid of each reading tube either to the anode or cathode of one of said receiving tubes, common anode and cathode connections for all of said reading tubes, a pair of electron tubes common to said reading tubes, and voltage divider networks connecting said last tubes to said common anode and cathode connections, said voltage divider networks being so arranged that one of said last tubes conducts only when all of said reading tubes are non-conducting and the other of said last tubes conducts only when one or more of said reading tubes are conducting.

13. Apparatus for reading telegraph code signals comprising a source of signals, a plurality of receiving electron tubes having anodes, cathodes and control grids, said control grids being connected to said source of signals, a plurality of electron reading tubes having anodes, cathodes and control grids, a voltage divider network in the anode-cathode circuit of each receiving tube, selecting means for selectively connecting the grid of each reading tube either to the anode or cathode of one of said receiving tubes, common anode and cathode connections for all of said reading tubes, a pair of electron tubes common to said reading tubes, voltage divider networks connecting said last tubes to said common anode and cathode connections, said voltage divider networks being so arranged that one of said last tubes conducts only when all of said reading tubes are non-conducting and the other of said last tubes conducts only when one or more of said reading tubes are conducting, and operative means responsive to the operation of one of said last tubes.

14. Apparatus for reading telegraph code signals comprising a source of signals, a plurality of receiving electron tubes having anodes, cathodes and control grids, said control grids being connected to said source of signals, a plurality of electron reading tubes having anodes, cathodes and control grids, a voltage divider network in the anode-cathode circuit of each receiving tube, selecting means for selectively connecting the grid of each reading tube either to the anode or cathode of one of said receiving tubes, common anode and cathode connections for all of said reading tubes, a pair of electron tubes common to said reading tubes, voltage divider networks connecting said last tubes to said common anode and cathode connections, said voltage divider networks being so arranged that one of said last tubes conducts only when all of said reading tubes are non-conducting and the other of said last tubes conducts only when one or more of said reading tubes are conducting, and code storage means for operating said selective means.

15. Apparatus for reading telegraph code signals comprising a source of signals, a plurality of electron receiving tubes having anodes, cathodes and control grids, said control grids being connected to said source of signals, a plurality of electron reading tubes having anodes, cathodes and control grids, voltage divider networks for selectively connecting the grid of each reading tube either to the anode or cathode of one of said receiving tubes, common anode and cathode connections for all of said reading tubes, a pair of electron tubes common to said reading tubes and voltage divider networks connecting the input circuit of said pair of tubes to said common anode and cathode connections, said voltage divider networks being so arranged that one of said pair of tubes conducts only when all of said reading tubes are non-conducting and the other of said pair of tubes conducts only when one or more of said reading tubes are conducting, means for completing the anode-cathode circuit of said pair of tubes periodically, a trigger circuit consisting of two electron tubes disposed in trigger circuit manner, and means for connecting the output of said pair of tubes to said trigger circuit, said trigger circuit being arranged to produce an impulse only when a predetermined one of said pair of tubes is conducting.

16. Permutation code signal reading apparatus, comprising a first set of electronic paths each associated with a respective impulse of the permutation code, means to apply signal impulses to the paths of said first set thereby selectively to produce open and closed conditions of the paths of said first set in accordance with said impulses, a second set of electronic paths each coupled to a respective one of the paths of said first set in a predetermined manner, means for modifying said manner of coupling in accordance with a predetermined permutation code, the paths of said second set each having open and closed conditions determined by the condition of the associated path of said first set, the respective paths of said second set being in identical conditions when the permutation code signal applied to said first set of paths corresponds to said predetermined permutation code, and means coupled to the paths of said second set to derive therefrom an output indication when the paths of said second set are in said identical conditions.

17. Permutation code signal reading apparatus, comprising a first set of electronic paths each associated with a respective impulse of the permutation code, means to apply signal impulses to the paths of said first set thereby selectively to produce open and closed conditions of the paths of said first set in accordance with the respective polarities of said impulses, a second set of electronic paths each coupled to a respective one of the paths of said first set in a predetermined manner, means for modifying said manner of coupling in accordance with a predetermined permutation code, the paths of said second set each having open and closed conditions determined by the condition of the associated path of said first set, the respective paths of said second set being in identical conditions when the permutation code signal applied to said first set of paths corresponds to said predetermined permutation code, and means coupled to the paths of said second set to derive therefrom an output indication when the paths of said second set are in said identical conditions.

WILLIAM STANLEY WESTERMAN EDGAR, JR.

References Cited in the file of this patent

UNITED STATES PATENTS

| Number | Name | Date |
|---|---|---|
| 2,074,392 | Herbst | Mar. 23, 1937 |
| 2,117,052 | Bailey et al. | May 10, 1938 |
| 2,319,263 | Potts | May 18, 1943 |
| 2,458,144 | Bush | Jan. 4, 1949 |
| 2,497,936 | Finch | Feb. 21, 1950 |